US011413978B2

(12) United States Patent
Johnson

(10) Patent No.: US 11,413,978 B2
(45) Date of Patent: Aug. 16, 2022

(54) BATTERY CHARGING SYSTEM FOR DRONES

(71) Applicant: Michigan Aerospace Corporation, Ann Arbor, MI (US)

(72) Inventor: Will Johnson, Ann Arbor, MI (US)

(73) Assignee: MICHIGAN AEROSPACE CORPORATION, Ypsilanti, MI (US)

(*) Notice: Subject to any disclaimer, the term of this patent is extended or adjusted under 35 U.S.C. 154(b) by 70 days.

(21) Appl. No.: 16/969,470

(22) PCT Filed: Feb. 13, 2019

(86) PCT No.: PCT/US2019/017798
§ 371 (c)(1),
(2) Date: Aug. 12, 2020

(87) PCT Pub. No.: WO2019/164720
PCT Pub. Date: Aug. 29, 2019

(65) Prior Publication Data
US 2020/0398688 A1 Dec. 24, 2020

Related U.S. Application Data

(60) Provisional application No. 62/633,822, filed on Feb. 22, 2018.

(51) Int. Cl.
*B60L 53/35* (2019.01)
*B60L 53/16* (2019.01)
(Continued)

(52) U.S. Cl.
CPC .............. *B60L 53/35* (2019.02); *B60L 53/16* (2019.02); *B64C 39/024* (2013.01);
(Continued)

(58) Field of Classification Search
CPC ........ B60L 53/35; B60L 53/16; B64C 39/024; H02J 7/0045; H02J 7/0047
(Continued)

(56) References Cited

U.S. PATENT DOCUMENTS 9,845,165 B2 * 12/2017 Michalski ............ G08G 5/0013
10,407,182 B1 * 9/2019 Alcorn ..................... B64F 1/125
(Continued)

FOREIGN PATENT DOCUMENTS

KR  101599423 B1  3/2016
KR  101822386 B1  1/2018

OTHER PUBLICATIONS

PCT International Preliminary Report on Patentability dated Aug. 27, 2020 in counterpart PCT application PCT/US2019/17798, 7 pages.
(Continued)

Primary Examiner — Richard V Muralidar
(74) Attorney, Agent, or Firm — Juan Carlos A. Marquez; Marquez IP Law Office, PLLC

(57) ABSTRACT

A charging system incorporates at least one motor; conductive charging arms rotatably coupled to the motor; a controller coupled to the motor and configured to rotate the conductive charging arms; and a sensor configured to sense the presence of a powered device and provide a signal to notify the controller of the presence of the powered device. In response to receiving the signal, the controller controls the motor to rotate the conductive arms to positions of electrical charging contact with the powered device. The powered device can be a drone powered by a rechargeable battery. The positions of electrical charging contact include electrical connections to terminals of the rechargeable bat-
(Continued)

tery. The charging system may also incorporate the feature of the motor having a stepper motor coupled to each of the conductive arms.

4 Claims, 4 Drawing Sheets

(51) Int. Cl.
*B64C 39/02* (2006.01)
*H02J 7/00* (2006.01)

(52) U.S. Cl.
CPC .......... *H02J 7/0045* (2013.01); *H02J 7/0047* (2013.01); *B60L 2200/10* (2013.01); *B64C 2201/12* (2013.01)

(58) Field of Classification Search
USPC ........................................ 320/107
See application file for complete search history.

(56) References Cited

U.S. PATENT DOCUMENTS

| | | |
|---|---|---|
| 2007/0142964 A1 | 6/2007 | Abramson |
| 2010/0174434 A1 | 7/2010 | Sip |
| 2015/0314695 A1* | 11/2015 | McGrath ................. B60L 53/68 320/109 |
| 2016/0039540 A1 | 2/2016 | Wang |
| 2016/0339791 A1 | 11/2016 | Sim |
| 2016/0347450 A1* | 12/2016 | Raniere ................... B64C 25/52 |

OTHER PUBLICATIONS

PCT International Search Report dated May 2, 2019 in counterpart PCT application PCT/US19/17798, 2 pages.
PCT Written Opinion dated May 2, 2019 in counterpart PCT application PCT/US19/17798, 6 pages.
Extended European Search Report, dated May 19, 2022 in counterpart European application EP 19 757 190/4, 7 pages.

* cited by examiner

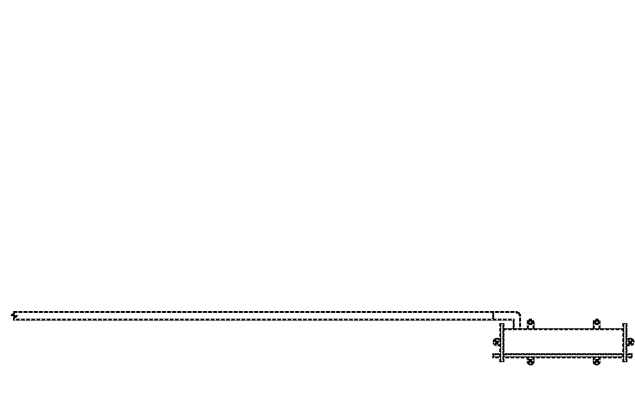
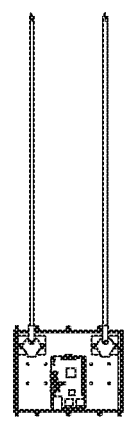
FIG. 3　　FIG. 4
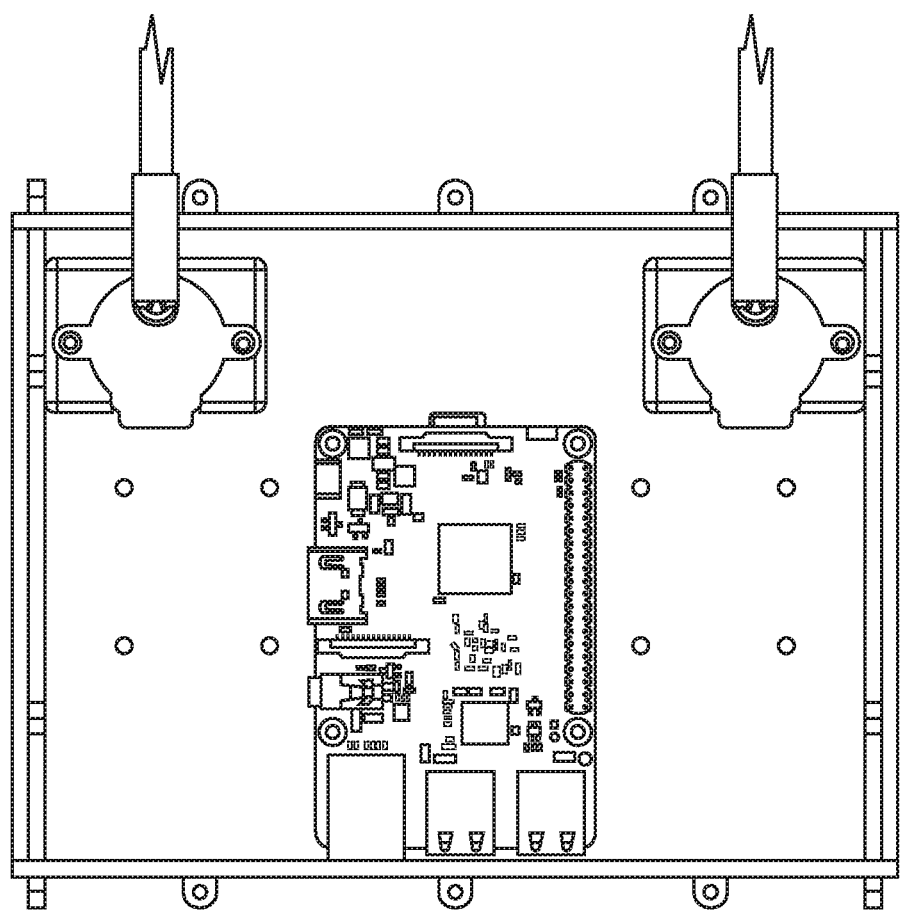
FIG. 5

BATTERY CHARGING SYSTEM FOR DRONES

This application claims priority to U.S. Provisional Application No. 62/633,822 filed on Feb. 22, 2018, the entire contents and disclosure of which are hereby incorporated by reference.

BACKGROUND OF THE INVENTION

Battery-powered devices are limited by the duration of their battery charge. Rechargeable batteries extend the usable life of device, but in order to take advantage, the battery should be charged conveniently with minimal interference with the function of the device.

Moreover, as battery-powered drones become more prevalent, they are being employed in various aerial applications such as data gathering, still photography, and video recording. Recreationally, for example, drones are commonly seen recording all-day events like weddings, sporting events, or holiday celebrations. Current drones powered by rechargeable batteries need to visit a charging station to be manually connected to a power source for their batteries to be recharged.

SUMMARY OF THE INVENTION

In at least a preferred embodiment, the present invention is directed to a charging system, comprising: at least one motor; conductive charging arms rotatably coupled to the at least one motor; a controller operably coupled to the at least one motor and configured to control the at least one motor to rotate the conductive charging arms; and a sensor operably coupled to the controller and configured to sense presence of a powered device and provide a signal to notify the controller of the presence of the powered device; wherein, in response to receiving the signal notifying of the presence of the powered device, the controller controls the at least one motor to rotate the conductive arms to positions of electrical charging contact with the powered device.

In at least one further embodiment of the charging system, the powered device is a drone powered by a rechargeable battery; and the positions of electrical charging contact include electrical connections to terminals of the rechargeable battery. In addition, the charging system may also incorporate the feature of the at least one motor including a respective stepper motor operably coupled to each of the conductive arms.

In another embodiment, the present invention is directed to a charging system, comprising: first and second motors; first and second conductive charging arms rotatably coupled to the first and second motors, respectively; a controller operably coupled to the first and second motors and configured to control the first and second motors to rotate the first and second conductive charging arms, respectively; and a sensor operably coupled to the controller and configured to sense presence of a powered device and provide a signal to notify the controller of the presence of the powered device; circuitry arranged to provide electrical charging power from the first and second conductive arms to respective terminals of a rechargeable battery of the powered device; and first and second conductive attachments configured to be attached to the powered device; wherein, in response to receiving the signal notifying of the presence of the powered device, the controller controls the first and second motors to rotate the first and second conductive arms to positions of electrical contact with the first and second conductive attachments, respectively; and wherein the circuitry is arranged to electrically connect the first and second conductive attachments to respective terminals of the rechargeable battery of the powered device. In at least one variation of this embodiment, the powered device is a drone.

DESCRIPTION OF THE DRAWINGS

The present invention is illustrated in the accompanying drawings, wherein:

FIG. 3 shows a side view of the base unit of the charging system according to at least one preferred embodiment of the present invention;

FIG. 4 shows a top view of the base unit of the charging system according to at least one preferred embodiment of the present invention;

FIG. 5 shows a general top view of the interior circuitry of the base unit of the charging system according to at least one preferred embodiment of the present invention;

DETAILED DESCRIPTION

With the intent to enable long durations of drone charging through automation, embodiments of the charging system described herein will enable users to deploy the system in an array of environments with whatever the expressed interest a user may have to utilize the system. Benefits of various designs include the need for only low precision in drone landing position and orientation, minimal drone modification allowing for arbitrary drone vehicle charging with the same charging device, and a minimal landing surface. In fact, only a flat patch of terrain is sufficient for locating the charger in one or more embodiments.

Figure 1:
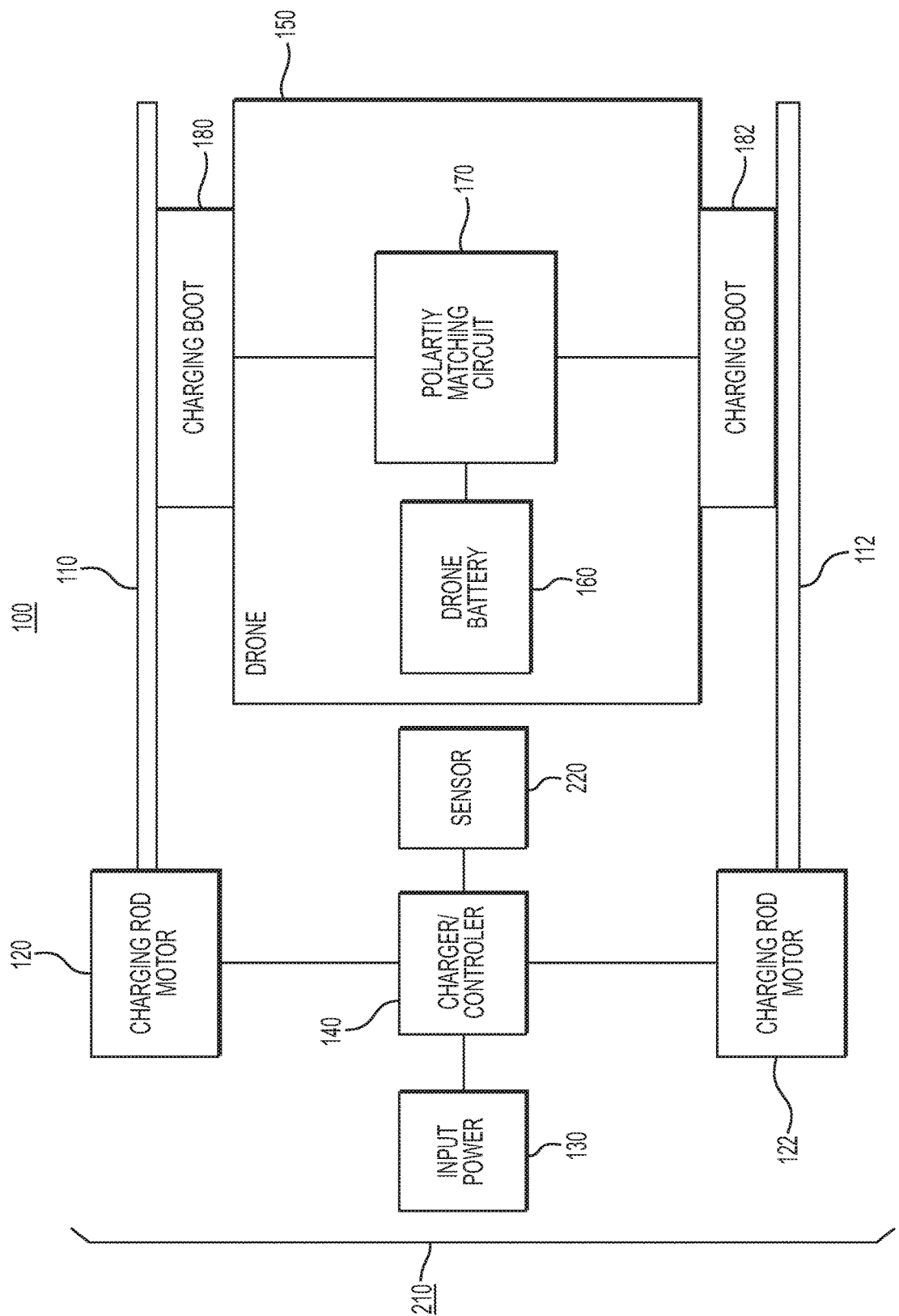
FIG. 1 illustrates a charging system according to at least one preferred embodiment of the present invention.

FIG. 1 illustrates a charging system 100 having two conductive arms 110, 112, for example rods, that are positioned to make electrical contact with corresponding contacts on a drone 150 that moves into position to be recharged. Charging arms 110, 112 are connected to charging rod motors 120, 122 respectively so as to rotate or swing together/apart about corresponding pivots depending on the size and position of the drone 150. The general design of the charging system 100 entails a variety of choices for the arms, arm actuation, and onboard controller for the system.

In at least a first embodiment of the present invention, the charging system 100 may further include an input power source 130 coupled to a battery charger/controller 140. Input power source 130 may be line power, a battery, fuel cell, solar panel, or other power source without limitation. The configuration of drone 150 is not limited except to the extent that it has a rechargeable battery 160 with charging terminals to connect to the charging system 100. Charging system 100 may further include a polarity matching circuit 170, which routes the positive and negative voltages from charging arms 110, 112 to match the proper terminals on battery 160. This ensures that no matter the orientation of the landing, a positive node and a negative node may make contact and ensure a charge is delivered to the drone. In this first embodiment, the polarity matching circuit is incorporated into the drone 150.

FIG. 1 further illustrates charging boots 180, 182 which operate as the terminals for the rechargeable battery 160 that connect to the charging system 100. In one or more embodiments, charging boots 180, 182 are configured to be attached to appropriate locations on drone 150 so as to be accessible to the conductive arms 110, 112 without the conductive arms interfering with or damaging any other part of the drone 150. Further, the charging boots 180, 182 are positioned such that, when the drone is in place in front of the charging system 100, the conductive arms 110, 112 are rotated into contact with the charging boots 180, 182, respectively. The presence of the drone 150 is detected via a sensor 220 connected to the charger/controller 140. When the sensor 220 detects the presence of the drone 150, the charger/controller 140 activates the motors 120,122 such that the conductive arms 110, 112 are rotated via the motors 120, 122, respectively, which are connected to the conductive arms. The motors 120, 122 are controlled by a charger/controller 140 so as to rotatively move the conductive arms 110,112 to contact the charging boots 180,182. In at least one embodiment, when electrical contact between the conductive arms 110,112 and the charging boots 180,182 is made, the charger/controller 140 detects the electrical contact and can begin charging power from input source 130 to the drone battery 160. In this first embodiment, the power inputted through the charging boots 180,182 is fed through the polarity matching circuit 170 in the drone 150. The polarity matching circuit 170 detects the polarity of the voltages inputted into it from the respective conductive arms 110,112, and configures its outputs (i.e., via a switching circuit) to match the polarities of the inputted voltages to the corresponding terminals of the rechargeable battery 160, thereby charging the battery.

Figure 2A:
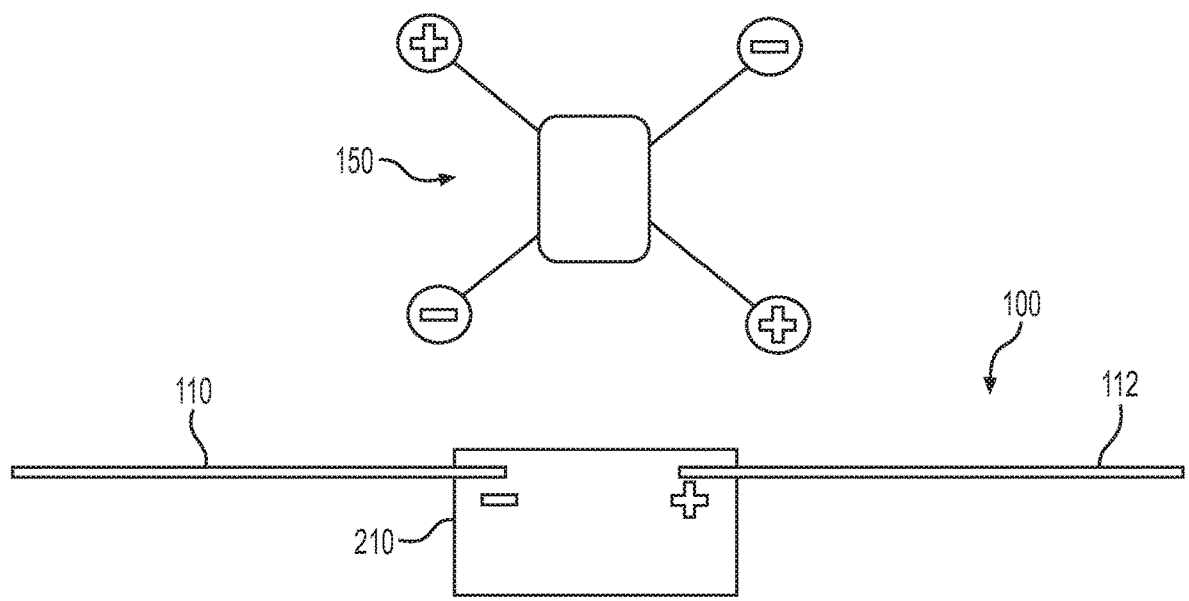
FIGS. 2A and 2B is a top view schematically showing a drone proximate to the base unit of the charging station in operation according to the present invention.
Figure 2B:
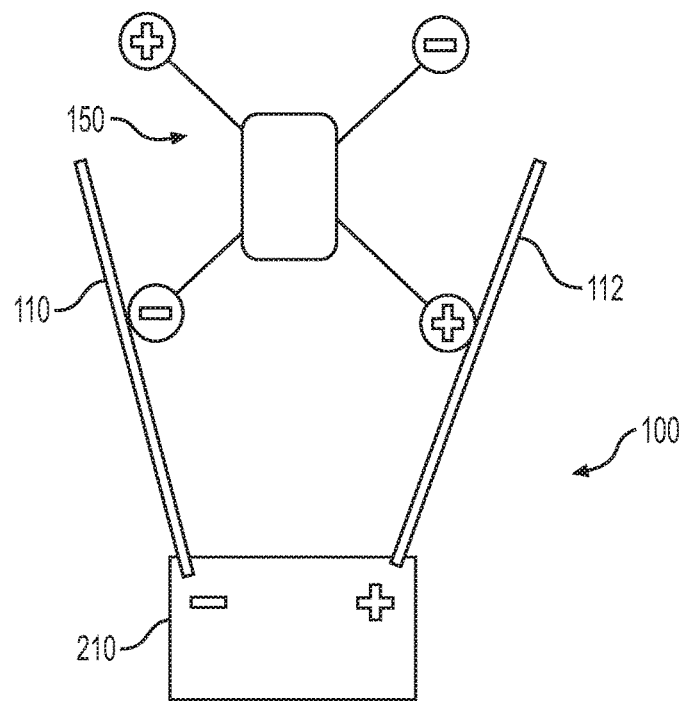

FIGS. 2A and 2B is a top view schematically showing the operation of a drone 150 proximate to charging station 100. For example, drone 150 may land near charging station 100. In the illustrated example, conductive arms 110, 112 are rotatably mounted to a base unit 210 that may incorporate the motors 120, 122 controlled by an onboard system in charger/controller 140 to help drive operation of charging system 100. There are a variety of ways which this may be achieved. In one or more examples, a Raspberry Pi device or other processor circuit is used to act as an onboard computer regulating actions for swinging charging arms 110, 112, detecting drone 150, and processing/sharing data collected from drone 150 at the end of each flight. The case of base station 210 may be light yet durable, enabling it to be deployed in a wide range of environments. In one or more embodiments, some form of detection be used in determining whether the drone has arrived. For example, as shown in FIG. 1, the sensor 220 operatively connected to the charger/controller 140 through the base unit 210 may be used to determine whether or not drone 150 has approached the charging station 100. There are a variety of detection techniques that may be employed, including a motion sensor, direct communication with the drone 150 (i.e., the drone communicates that it has landed in the target area and charging system 100 takes over swinging charging arms 110, 112), an optical beam detector (i.e., the drone 150 interrupts or reflects an optical beam emitted by the detector), or other detection devices similar to those used to detect the presence or motion of moving objects in other applications.

The charging system 100 may be configured to work with many, most, or all drones if appropriately modified or configured to incorporate at least a rechargeable battery circuit with charging boots 180,182 that correctly positioned to align with the charging system 100. Example modifications may include clamping charging boots 180, 182 on the drone legs (for example, where conductive arms 110, 112 contact with the drone legs). On the charger side, the heights of the charging arms 110,112 may be adjustable to match the charging boot height. In one or more embodiments, charging boots 180, 182 may be attached to the drone at the height of conductive arms 110, 112, in which case all drones provided with the charging boots at the same height can all be charged by the same charging station.

Charging boots 180, 182 may be applied to the legs of drone 150 as they are commonly structural vertical components of the drone, although other locations suitable to the positioning and motion of charging arms 110, 112 and structure of drone 150 are contemplated. For example, a small pole (not shown) that stands up above drone 150 with charging boots 180, 182 built into it could be arranged to make the same electrical contact with charging arms 110, 112 as though charging boots 180, 182 were attached to the drone legs. Such an arrangement might be particularly advantageous in instances where the user might not be able to easily clamp charging boots 180, 182 on the legs.

In another example, charging boots 180, 182 could be more invasively attached such as with screws or nuts/bolts, instead of or in addition to clamps. but clamp-on charging boots avoid the need to drill into the drone body and charging boots 180, 182. Another option is replacement drone legs having charging boots 180, 182 already attached, but such replacement legs might need to be customized to the drone 150, whereas clamp-on charging boots might have greater universality. Regardless of the charging boot scheme, the drone 150 will need an electrical connection to be made between the battery connections on drone 150 and charging boots 180, 182 to route charging voltage to the battery 160 from the charging system 100.

In one or more embodiments, and without limitation, charging arms 110, 112 may be constructed of carbon fiber, graphite, or metal tubing, or with a non-conductive material provided with an electrically conductive material such as by plating or wiring (external or internal) connected to appropriate contacts at either end of charging arms 110, 112. By way of nonlimiting example, electrical conduction through charging arms 110, 112 may be accomplished either through the graphite or metal if used as the rod material, or through a gold coating on the rod to minimize corrosion of electrical contacts. Charging arm actuation may be through one or more electrical motors such as a DC or stepper motor driving charging arms 110, 112 directly or through a gearbox to match the motor speed to the desired arm swinging speed.

Additionally or alternatively, the charging station 100 may be controlled remotely. Example implementations may involve connecting the charging station 100 to an internet network either with a direct internet connection or through wifi, enabling remote control, operation, and monitoring.

In one or more embodiments, the drone 150 may have an augmentation applied to it enabling the conductive arms 110, 112 to better interface with the battery 160. By way of nonlimiting example, attached to each of the drones landing legs may be a conductive coupling with a v-cut groove matching the depth of the charging arms.

One or more constituent components of the charging station 100 may be contained within a suitable housing. In one or more embodiments, battery charger 140, charging rod motors 120, 122, and related electrical and mechanical couplings between them and between charging rod motors 120, 122 and charging arms 110, 112 may be housed in an acrylic casing. Charging arms 110, 112 may be provided with a conductive adhesive to carry out the charge. In one or more embodiments, power may be inputted to the charging station 100 via USB connection. The input power may be provided by one or more of line power, batteries, fuel cells, or solar panels. To conserve power, the charging station 100 may be configured with a sleep mode, in which the charging station 100 powers down or off after a predetermined time of inactivity. The charging station 100 may be awakened from its sleep mode by a signal from the drone 150 or upon sensing the drone 150, for example.

In one or more embodiments, the charging station 100 may be provided with a platform that is easily broken down and transported to a new site. For even greater portability, a small motor/controller box and detachable charging arms may be used.

In one or more embodiments, the charging station 100 may include data uplink hardware controlled by the charger/controller 140. Data, including but not limited to environmental conditions, photographic data, video data, or audio data may be retrieved from drone 150 and transmitted via wifi or Bluetooth for example. With this capability, charging station 100 enables long-ranged data collection over extended intervals of time. For example, a user can simply deploy the charging station 100, collect the aerial data that is needed, and pack up from the site, potentially reducing or eliminating labor costs associated with, e.g., a pilot, a drone technician, and other staff that may be required to charge the drone and redeploy it back into the field.

FIGS. 3-9 illustrate examples of the disclosed battery charging system, including examples suitable for charging a battery-powered drone, although other applications are contemplated. Specifically, FIG. 3 shows a side view of the base unit 210 and charging arms 110,112 of the charging system 100, while FIG. 4 shows a top view of the base unit 210 and charging arms 110,112, and FIG. 5 shows a general top view of an example implementation of the interior circuitry of the base unit 210 of the charging system 100.

Figure 7:
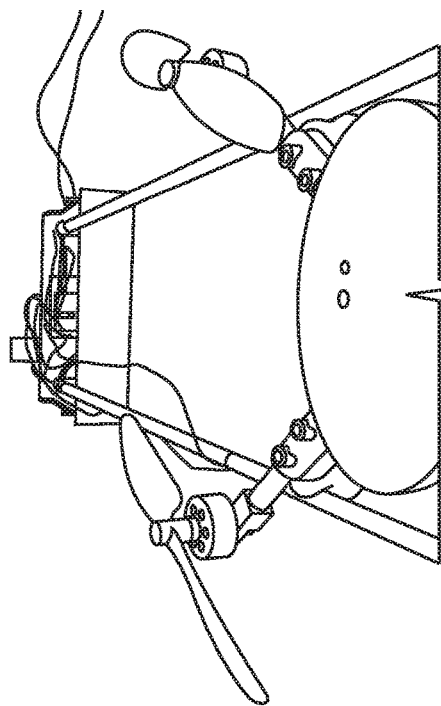
FIG. 7 shows a second front perspective view of a drone proximate to the base unit of the charging station in operation according to the present invention.
Figure 9:
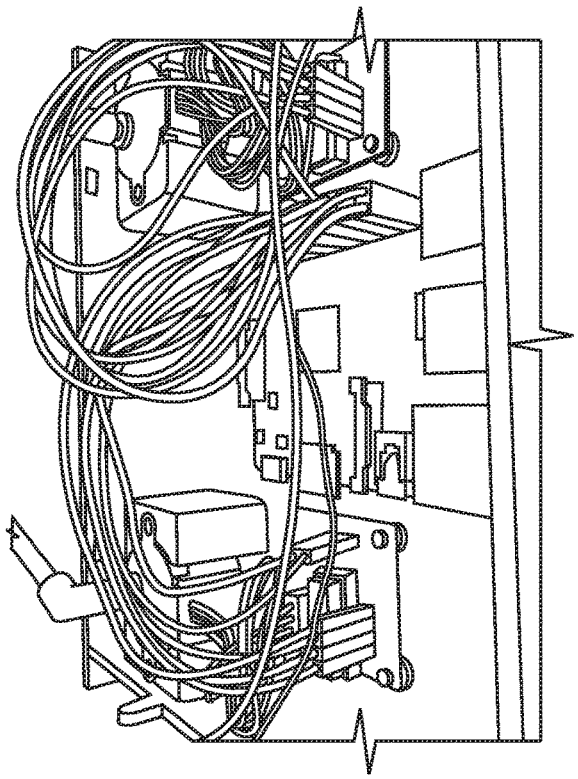
FIG. 9 shows a front perspective view of the interior circuitry of the base unit of the charging station in operation according to the present invention.
Figure 6:
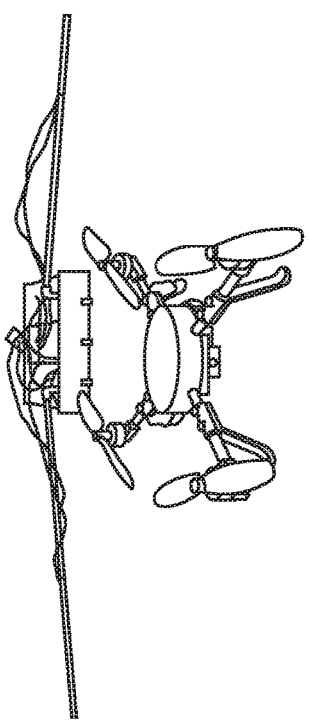
FIG. 6 shows a first front perspective view of a drone proximate to the base unit of the charging station in operation according to the present invention.
Figure 8:
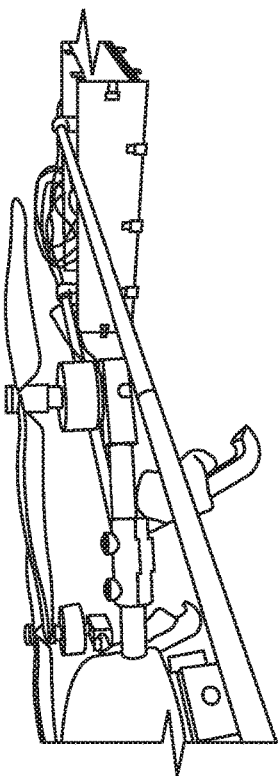
FIG. 8 shows a side perspective view of a drone proximate to the base unit of the charging station in operation according to the present invention.

FIG. 6 shows a first front perspective view of a drone 150 proximate to the base unit 210 of the charging station 100 in an example operation. FIG. 7 shows a second front perspective view of the drone 150 proximate to the base unit 210 of the charging station 100 in operation. FIG. 8 shows a side perspective view of a drone 150 proximate to the base unit 210 of the charging station 100. Lastly, FIG. 9 shows a front perspective view of an example of the interior circuitry of the base unit 210 of the charging station 100 in operation according to the present invention.

Embodiments of a battery charging system have been described in the context of a battery-powered drone, including as one example an automated drone charging system that requires low precision in drone landing position and orientation, requires minimal drone modification allowing for arbitrary drone vehicle charging with the same charging device, and that does not require a large landing surface to land and by charged. Such advantages are merely illustrative and the disclosed embodiments may enjoy one or more of these advantages as well as other advantages. Moreover, the disclosed battery charging system is not limited to charging battery-powered drones, but may be used to charge other batteries and battery-powered devices.

Various changes and modifications to the disclosed battery charging system will be apparent to those skilled in the art. All such changes and modifications that rely on the basic teachings and principles through which the invention has advanced the state of the art are to be understood as included within the spirit and scope of the present invention.

The invention claimed is:

1. A charging system, comprising:
   at least one motor;
   conductive charging arms rotatably coupled to the at least one motor;
   a controller operably coupled to the at least one motor and configured to control the at least one motor to rotate the conductive charging arms; and
   a sensor operably coupled to the controller and configured to sense presence of a powered device and provide a signal to notify the controller of the presence of the powered device;
   wherein, in response to receiving the signal notifying of the presence of the powered device, the controller controls the at least one motor to rotate the conductive charging arms to positions of electrical charging contact with the powered device,
   wherein the powered device is a drone powered by a rechargeable battery; and
   wherein the positions of electrical charging contact include electrical connections to terminals of the rechargeable battery.

2. The charging system of claim 1, wherein the at least one motor includes a respective stepper motor operably coupled to each of the conductive arms.

3. A charging system, comprising:
   first and second motors;
   first and second conductive charging arms rotatably coupled to the first and second motors, respectively;
   a controller operably coupled to the first and second motors and configured to control the first and second motors to rotate the first and second conductive charging arms, respectively;
   a sensor operably coupled to the controller and configured to sense presence of a powered device and provide a signal to notify the controller of the presence of the powered device;
   circuitry arranged to provide electrical charging power from the first and second conductive charging arms to respective terminals of a rechargeable battery of the powered device; and
   first and second conductive attachments configured to be attached to the powered device;
   wherein, in response to receiving the signal notifying of the presence of the powered device, the controller controls the first and second motors to rotate the first and second conductive charging arms to positions of electrical contact with the first and second conductive attachments, respectively, and
   wherein the circuitry is arranged to electrically connect the first and second conductive attachments to respective terminals of the rechargeable battery of the powered device.

4. The charging system according to claim 3, wherein the powered device is a drone.

* * * * *